No. 671,685. Patented Apr. 9, 1901.
A. XANDER.
FILTER.
(Application filed Apr. 7, 1900.)
(No Model.)
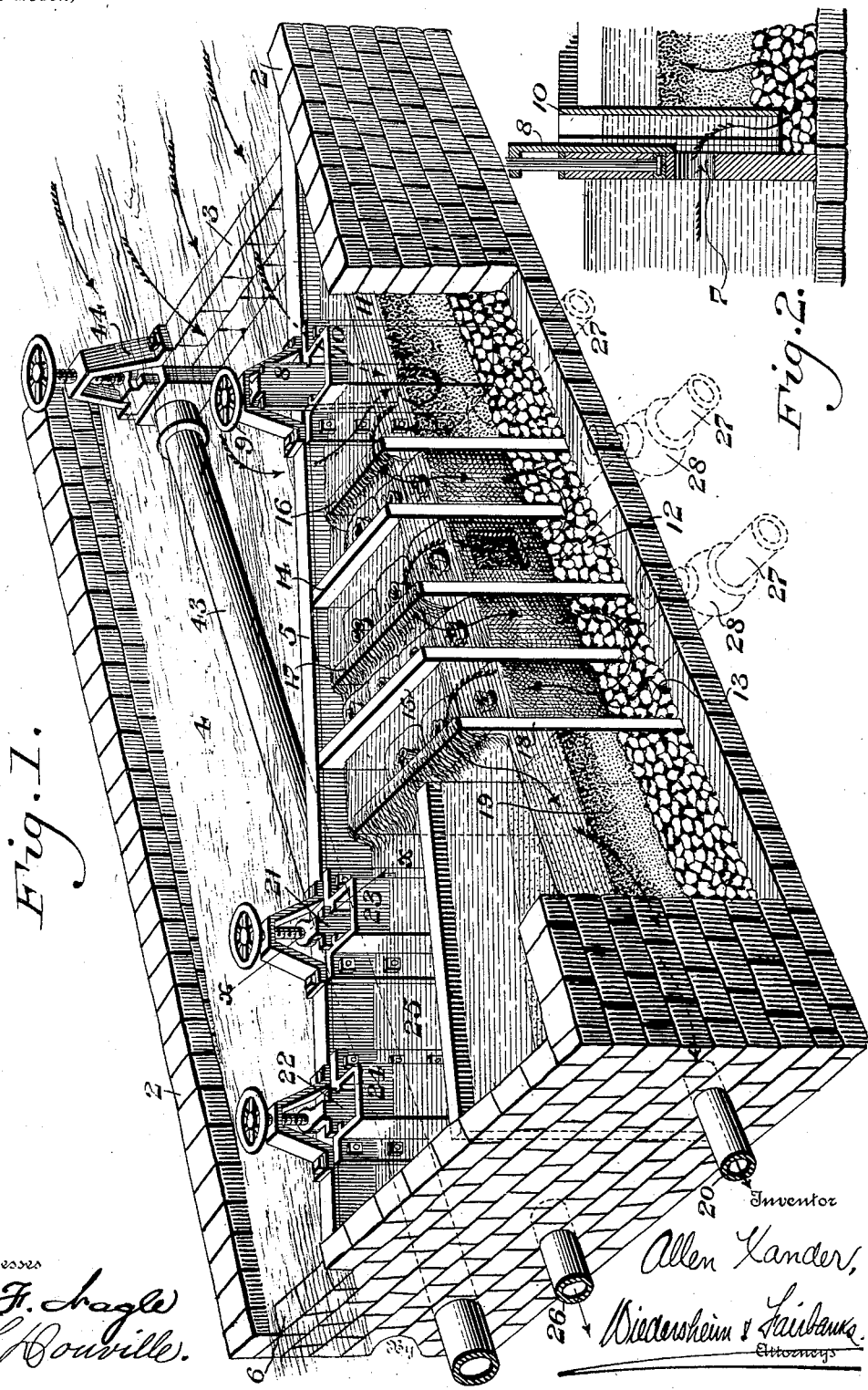

UNITED STATES PATENT OFFICE.

ALLEN XANDER, OF LOCKHAVEN, PENNSYLVANIA, ASSIGNOR OF ONE-HALF TO GEORGE W. SCHULTZ, OF PHILADELPHIA, PENNSYLVANIA.

FILTER.

SPECIFICATION forming part of Letters Patent No. 671,685, dated April 9, 1901.

Application filed April 7, 1900. Serial No. 11,930. (No model.)

*To all whom it may concern:*

Be it known that I, ALLEN XANDER, a citizen of the United States, residing in Lockhaven, county of Clinton, State of Pennsylvania, have invented a new and useful Improvement in Filters, which improvement is fully set forth in the following specification and accompanying drawings.

My invention consists of an improvement in filters, more especially adapted for use in streams and reservoirs, where it is desired to utilize the current or power in passing the water through the filter; and it consists, further, in the details of construction hereinafter fully described and claimed.

Figure 1 represents a perspective view of a filter embodying my invention, showing a portion of the side wall broken away and being adapted for use in streams. Fig. 2 represents a sectional view on line x x, Fig. 1.

Similar numerals of reference indicate corresponding parts in both figures.

The filter is provided with the walls 2, formed of masonry or other suitable material, and having the wall 3, which is lower than the water-line and is at that end of the filter toward which the water flows, the said wall checking the heavy materials—such as branches, &c.—from entering the main chamber 4 of the filter.

5 designates a wall or partition dividing the body of said filter so that the chamber 4 is narrower at one end than at the other, it being seen that the water will be at a somewhat higher level at the narrow end and is permitted to overflow the wall 2 at 6, if desired.

In the wall 5 is an opening 7, which is controlled by a valve 8, operated by any suitable means, in the present instance by a wheel 9, suitably supported.

10 designates an angular plate secured to the wall 5, adjacent the opening 7, forming a conduit into which the water enters through said opening, said conduit leading to a filtering-chamber 11, in which is placed any suitable filtering material, such as broken silica, rock, sand, &c. Adjacent said chamber 11 are the filtering-chambers 12 and 13, each of which is provided with a partition 14 and 15 slightly above the bottom, each of said chambers being also filled with suitable filtering material and having the dividing-walls 16, 17, and 18.

19 designates a chamber adjacent the chamber 13 and into which the water is conducted in a purified condition, from which it can be withdrawn through the pipe 20.

In the wall 5 are the valves 21 and 22, controlling openings leading into conduits 23 and 24, which conduct the water into a filtering-chamber 25, filled with suitable filtering material, from which the water is conducted through the pipe 26, it being seen that when the water is not very dirty it can be filtered in this manner, thus saving time. Below each of the chambers is a pipe 27, having suitable valves 28 to control the same, said pipes being used when it is desired to clean the filtering material by drawing off the water.

43 designates a pipe which is situated below the top of the wall 3 in said chamber 4, the one end thereof being controlled by a suitable valve 44, which is operated in any suitable manner, said pipe passing completely through the filter and leading to any suitable place, it being seen that when mud, dirt, &c., have accumulated at the wall 3 by opening the valve 44 some of the water will pass through the pipe 43, thus causing a suction which will draw in a greater portion of the said mud, dirt, and other material, and thus preventing the same from accumulating at said wall 3 to such an extent as to overflow the filter.

The operation will be readily seen. The water flows over the wall 3 into the chamber 4, and if said water is not very dirty the valves 21 and 22 are opened and the water flows into the conduits 23 and 24, which direct the water to the filtering material through which it passes and into the chamber 25 in a clean condition, from which it is conducted by the pipe 26. If the water is muddy and dirty, the valves 21 and 22 are closed and the valve 8 is opened, so that the water passes through the opening 7 into the conduit formed by the angular plate 10, which conducts the water to the filtering material in the chamber 11. It leaves this chamber by flowing over the wall 16 and into the compartment 12, under the partition 14, over the wall 17 into the chamber 13, under the partition 15, and over the wall 18, thus passing upward and downward through the filtering material in said chamber and at last reaching the chamber 19 in a clean condition, from where it can be withdrawn through the pipe 20.

Having thus described my invention, what I claim as new, and desire to secure by Letters Patent, is—

1. In a filter, a main chamber having an inlet and outlet at opposite ends thereof and adapted to be situated in a watercourse, and a filtering-chamber communicating therewith through the side thereof.

2. In a filter, a main chamber adapted to be situated in a watercourse, and having a low wall at one end thereof forming an inlet, a higher wall at the opposite end thereof forming an outlet, and a filtering-chamber communicating with said main chamber through the side thereof.

3. In a filter, a main chamber adapted to be situated in a watercourse and having a wide inlet end, a narrow outlet end opposite the same, and a filtering-chamber communicating with said main chamber through a side wall thereof.

4. In a filter, a main chamber, a filtering-chamber communicating therewith, a plurality of filtering-chambers communicating with said first-mentioned filtering-chamber and having an outlet, and a second filtering-chamber communicating with the main chamber independently of said first-mentioned filtering-chamber and provided with an outlet for filtered water.

5. In a filter, a main chamber, a filtering-chamber communicating therewith, through a valve-controlled opening in a wall thereof, and a conduit in said filtering-chamber into which said opening leads, said conduit having an opening at its lower end near the bottom of said filtering-chamber.

6. In a filter, a main chamber situated in a watercourse and having a low wall at its upper end, a filtering-chamber communicating therewith, and a pipe or passage having an inlet at the upper side of said low wall and leading to a point below the filter and provided with means for opening and closing the same.

ALLEN XANDER.

Witnesses:
GEO. A. BROWN,
KATHRYN FUREY.